July 27, 1926.
J. E. MITCHELL
1,593,664
REFRIGERATION SYSTEM FOR COOLING DRINKING WATER
Filed Jan. 30, 1924
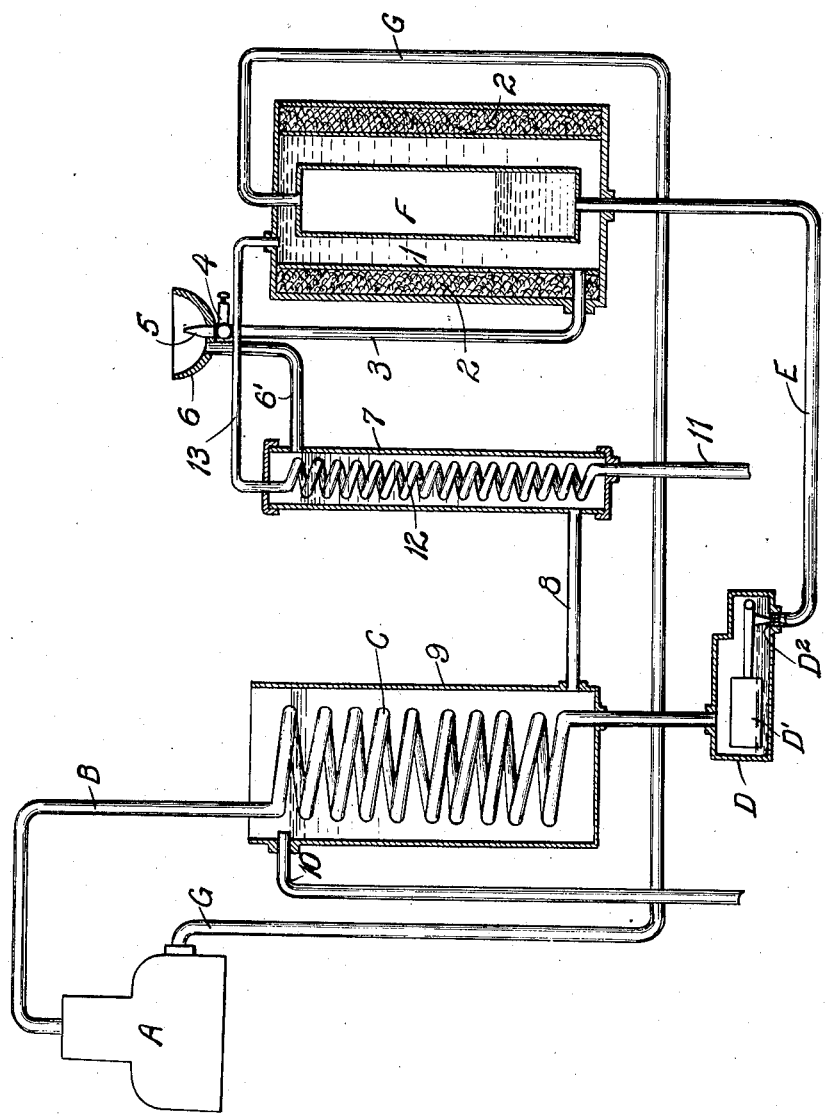
INVENTOR:
JOHN E. MITCHELL
BY Bruce S. Elliott
ATTORNEY Patented July 27, 1926.

1,593,664

UNITED STATES PATENT OFFICE.

JOHN E. MITCHELL, OF ST. LOUIS, MISSOURI.

REFRIGERATION SYSTEM FOR COOLING DRINKING WATER.

Application filed January 30, 1924. Serial No. 689,429.

This invention relates to a novel construction and arrangement of apparatus providing a refrigerating system for use in cooling drinking water.

The main object of the invention is to utilize waste water cooled by the system to assist the refrigerating or cooling operation.

A further and more detailed object of the invention is to utilize waste cooled water in pre-cooling the warm water supplied to the cooling chamber to be cooled for drinking purposes.

A still further object of the invention is to utilize waste water cooled by the system to assist the refrigerating or cooling operation, and, in addition, to utilize said waste water for cooling the condensing coils of the refrigerating system.

In the preferred embodiment of the invention, the waste cooled water is first utilized to pre-cool the warm water passing to the cooling chamber and thereafter it is conducted to the condenser, operating to maintain a supply of cooled water around the condensing coils.

My invention is preferably used in connection with a sanitary drinking fountain in which the water to be drunk is caused to bubble or spurt up from a spout by operating a valve, the unconsumed water being caught in a small basin. In these drinking fountains, this water is led from the basin to the sewer. According to my invention, it is utilized for assisting the cooling and condensing operations in the manner above referred to.

Before proceeding with a detailed description of the invention, it is deemed desirable to point out the pronounced advantages of my invention in its contemplated application to a mechanical refrigerating system. In drinking fountains where the water is cooled by ice, there would be very little advantage gained in the use of the waste water for pre-cooling purposes, as the saving in the amount of ice used would be of minor importance from the standpoint of cost, and such a cooler can be replenished with ice during the day if made necessary by means of a heavy demand for cooled water. In the case of a mechanical refrigerating unit, however, the capacity of the machine cannot be suddenly enlarged or added to, and although it may be substantially quiescent during the night, heavy demands may be made upon it during some parts of the day. The pre-cooling feature, therefore, becomes important in assisting the machine to meet such extra demands, since the temperature of the pre-cooled water obviously does not have to be lowered as many degrees to reach the proper temperature for drinking as would be the case without pre-cooling it, and the more water is consumed or used, the more waste water there will be for pre-cooling.

Putting the matter in another way, a machine or mechanical refrigerating unit of the character to which my invention particularly applies, is ordinarily limited to the use of a one-quarter H. P. motor, since a larger motor would require extra wiring, special permits, etc. With this limitation as to power, an efficient mechanical refrigerating unit has a capacity for cooling water equal to the melting capacity of between two-hundred and three-hundred pounds of ice per twenty-four hours. Since, however, the system must maintain a fairly uniform temperature of the cooled water, it can only operate as the water is consumed or drawn away from the cooling chamber. Therefore, it ordinarily does not work at all during the night time, but by reason of the large quantity of water consumed during some parts of the day, it would be very difficult, if not impossible, for the machine to cool the water down to the proper temperature during such periods of extensive use without the assistance of the pre-cooling feature which operates to lower the temperature of the incoming water several degrees before the machine has any work to do on it at all.

The invention is illustrated in the accompanying drawings, in which the figure is a diagrammatic view of a system arranged according to my invention, the view being largely in sectional elevation.

The refrigerating unit which I employ, and to which I lay no claim as to novelty in itself, comprises a compressor A which forces the compressed refrigerant through the pipe B to the condensing coil C and from the bottom of the condensing coil the liquefied refrigerant goes to the distributor D. The float D' in the distributor controls a valve D² and thereby prevents gases from passing, but permits the liquefied refrigerant to feed through the pipe E to the evaporator F, in the lower portion of which a sufficient quantity of the liquid refrigerant is maintained. When this liquid evaporates in absorbing heat through the walls of the evaporator F, the gases formed pass out of the top of the evaporator F and back through the piping G to the suction or low pressure side of the compressor A.

I will now describe the application and use of my invention in connection with such a refrigerating unit.

The evaporating chamber F of the refrigerating unit is mounted or enclosed within the water tank 1 which has heavily insulated walls 2. The tank 1 is kept filled with drinking water under pressure which, while the machine is in operation, is constantly cooled or refrigerated by the chilled walls of the evaporating chamber F. The colder water at the bottom of the tank 1 has an outlet through pipe 3 to the valve 4. When this valve is opened, the water bubbles up through the nozzle 5 a sufficient height for sanitary drinking purposes. The waste water is caught by the basin 6 and drains through the pipe 6' into the stand-pipe 7. From the bottom of this stand-pipe the waste water flows through the pipe 8 to the tank 9 which surrounds the condensing coil C of the refrigerating unit. The tank 9 is provided above the top of the condensing coil C with an over-flow pipe 10 through which the waste or heated water is finally discharged.

The water supply from the city main is connected to the pipe 11 and flows upward through a pre-cooling coil 12 and from the top of this coil the water flows through pipe 13 into the top of the cooling tank 1, where it is held under pressure. The amount of the water let in at the top of the cooling tank is, of course, in exact proportion to the amount drawn out at the bottom of the tank through the pipe 3 and drinking fountain, the flow of water being intermittent as it only flows when someone drinking at the fountain operates the spring valve 4.

To more fully explain what occurs in the use of my invention, it will be assumed that the main water supply coming to the machine through pipe 11 is about 80° F. in the hottest weather, and that the refrigerated water from the bottom of the cooling tank 1 in pipe 3 leading to the drinking fountain is 40° F. It is obvious that if the main supply of water at 80° were sent directly to the top of the cooling tank, enough refrigeration would have to be used to lower the temperature from 80° to 40°. By first sending the main supply of water, however, through the pre-cooling coil 12 where it is surrounded by the waste water which comes in at the top of the stand-pipe 7 at a temperature of 40°, the temperature of the water inside the coil will equalize with the temperature of the waste water surrounding the coil. In other words, the waste water which enters the top of the stand-pipe 7 at a temperature of 40° F. will be at a higher temperature, or around 60° F. by the time it leaves the bottom of the stand-pipe; and, on the other hand, the drinking water supply which enters the bottom of the pre-cooling coil at 80° F. will gradually get colder and leave the top of the coil at a temperature of about 60° F. so that when it enters the top of the cooling tank 1 it only requires sufficient refrigeration to lower the temperature 20 degrees to bring it down to a temperature of 40° F. instead of that which would be required to lower the temperature from 80° F. to 40° F. without the pre-cooling. This, it will be clear, results in effecting a considerable saving in refrigeration.

Furthermore, after the waste water has served the purpose of pre-cooling the drinking water supply, it goes to the tank 9 for cooling the condensing coils, and since it is still at a lower temperature than the main water supply, it is more effective for cooling purposes; in other words, a given quantity of this cooled water will condense the refrigerant at lower pressures than the warm water of the city supply, so that a saving of power is effected in the operation of the compressor.

The tank 9 is made large enough to carry a sufficient quantity of water around the condensing coils to compensate for the intermittency of flow. In other words, the supply of water is great enough so that the temperature is not raised materially during the intervals when there is no water flowing.

It will be understood that my invention could be equally well used in connection with an ordinary faucet from which cooled water is drawn into a glass, to be drunk, the waste water, both from the faucet and that unconsumed being caught in a basin where it passes off through a drain pipe. Inasmuch, however, as the bubble or spouting type of drinking fountain is very generally used for sanitary reasons, i. e., to avoid the necessity for using glasses, cups, etc., I have shown my invention as utilized in connection with this type of fountain or drinking water supply.

I claim:—

1. A refrigerating system for cooling drinking water comprising, in combination with a conventional refrigerating unit including a condensing coil surrounded by a condensing chamber, a cooling chamber and means for delivering water thereto to be cooled by the refrigerating action, means for delivering the cooled water to a place of use, means for applying waste cooled water for lowering the temperature of the water to be cooled by the refrigerating system, and means for thereafter conducting the waste cooled water to said condensing chamber.

2. A refrigerating system for cooling drinking water comprising, in combination with a conventional refrigerating unit including a condensing coil surrounded by a condensing chamber, a cooling chamber, a conduit for delivering water thereto to be cooled by the refrigerating action, a stand-pipe surrounding a portion of said conduit exterior to said cooling chamber, means for delivering the cooled water to a place of use, a waste basin located at the delivery point of the cooled water, means for conducting waste cooled water from said basin to said stand-pipe for pre-cooling the water prior to its entrance into said cooling chamber, and a conduit connecting said stand-pipe with said condensing chamber.

3. A refrigerating system for cooling drinking water comprising, in combination with a conventional refrigerating unit including a condenser, a cooling chamber and means for delivering water thereto to be cooled by the refrigerating action, means for delivering the cooled water to a place of use, and means for conducting waste cooled water to said condenser and applying the same to condensing the refrigerant.

In testimony whereof, I have hereunto set my hand.

JOHN E. MITCHELL.